United States Patent

Alcaraz

[11] Patent Number: 5,888,566
[45] Date of Patent: Mar. 30, 1999

[54] METHOD FOR PREPARING A LONG-LIFE PASTEURISED PRODUCT, PARTICULARLY A FOOD PRODUCT

[76] Inventor: Gerard Alcaraz, 10 bis. rue Saint-Martin, Quetigny, France, F-21800

[21] Appl. No.: 750,965
[22] PCT Filed: Jun. 22, 1995
[86] PCT No.: PCT/FR95/00835
 § 371 Date: Mar. 11, 1997
 § 102(e) Date: Mar. 11, 1997
[87] PCT Pub. No.: WO95/35039
 PCT Pub. Date: Dec. 28, 1995

[30] Foreign Application Priority Data

Jun. 22, 1994 [FR] France ................................. 94 07632

[51] Int. Cl.⁶ ........................................................ A23B 4/00
[52] U.S. Cl. .......................... 426/233; 426/521; 426/523
[58] Field of Search ................................. 426/231, 233, 426/521, 523

[56] References Cited

U.S. PATENT DOCUMENTS 5,094,864  3/1992  Pinon et al. ............................ 426/233

FOREIGN PATENT DOCUMENTS 0 419 304  3/1991  European Pat. Off. .

*Primary Examiner*—George Yeung
*Attorney, Agent, or Firm*—Jacobson, Price, Holman & Stern, PLLC

[57] ABSTRACT

A method for preparing a product to be pasteurized, particularly a food product, to ensure a long shelf life without affecting the quality or the nutritional, rheological and organoleptic properties thereof. The method comprises determining the cooking threshold value (Cg) of the product, measuring its pH and rH2, and deducing the corresponding pasteurization threshold value (P) therefrom, in particular by using a curve shown, then measuring the ratio (Aw) between the free water and total water contained in the product, and determining the heating curve of a heat treatment carried out on the product in such a way that the cooking threshold value is reached as the pasteurization threshold value is also reached and preferably exceeded, while at the same time the product is in a physical and chemical condition which corresponds to the *Clostridium botulinum* germ inhibition region.

5 Claims, 6 Drawing Sheets

METHOD FOR PREPARING A LONG-LIFE PASTEURISED PRODUCT, PARTICULARLY A FOOD PRODUCT

The invention relates to a method of preparing a pasteurised product, especially but not exclusively a food having a long shelf life. The method comprises heat treatment and ensures a long shelf life in positive cold (between +3° C. and +5° C.) without affecting the main chemical, rheological and/or organoleptic qualities and characteristics, in particular the taste, compared with the corresponding non-pasteurised products, that is the same food or other products except that they have not undergone any heat treatment except that necessary for preparing them.

In order to obtain a long shelf life for pasteurised products, it is at present well-known to use a number of different methods such as bottling, sterilisation, pasteurisation, deep-freezing, ionisation by irradiation, freeze-drying or, more recently, high pressures.

Sterilisation is a conservation process which, in its conventional form, adversely affects the processed products with regard to their nutritional, rheological and organoleptic qualities, and particularly affects their taste and appearance as a result of the required treatment temperatures. Consequently this method cannot be used for producing or preparing high-quality products. As a result, the method is not usable on a large scale except for treating products which are not initially high-quality, or products which are not damaged by high-temperature treatment. It is used in particular for liquids such as milk.

Deep-freezing is a method of preservation which also causes irreversible physical and chemical damage of the processed products, inter alia by affecting the proteins and starch therein, through exposure of the processed products to negative cold. In addition the processed products, owing to the inevitable presence of internal ice crystals, will lose their texture and rheological characteristics during cooking and during any subsequent heat-treatment such as pasteurisation. For these reasons, deep-freezing is used only for preparing products which are not high quality or are not damaged by negative cold.

Refrigeration is a method of preservation which is satisfactory on the organoleptic level, provided that the refrigerated food products are preserved for a very short time. However, this process has the disadvantage of not interrupting the microbial or the enzymatic activity. In particular, spores of *Clostridium botulinum* type E, which are the most dangerous micro-organisms to the human organism out of those potentially present in food products, may germinate under certain temperature conditions occurring during preservation in positive cold, more particularly when the cold is interrupted or when the temperature rises above 2.2° C., and grow at +3° C. or above.

Freeze-drying is a method of preservation which is very difficult to work and is also restricted to a few products, for example food, or raw materials which are not of high quality. The resulting dehydration of the product causes very complex problems of texture and rehydration, which limit the process to products suitable for freeze-drying.

Preservation of fresh food in positive cold and in vacuo is a recent process which slows down or stops the growth of most aerobic microbial flora. In some cases however (high pH, high microbial burden, insufficient lactic flora or slight interruption of cold) it may favour the germination and growth of the most dangerous anaerobic micro-organisms such as *Clostridium botulinum* and may also result in regions such as exudates and substrates which are particularly favourable to growth of all strictly or optionally anaerobic bacteria. This known method is therefore difficult in operation.

Ionising irradiation is permitted only for certain products, at irradiation doses such as to reduce the microbial burden without destroying it completely. In addition, the sterilising doses may damage food products, and knowledge in this sector is very incomplete as regards the toxicological risk, with the result that the process is authorised only for packaging. Another disadvantage of this preservation process is that irradiation installations are very expensive and the risk during using them means that very strict precautions must be taken.

High pressures are a recent technique which will still take many years before being mastered. In addition to the very high cost of the installations, which at present can process only reduced volumes of products, the high pressures have an adverse effect inter alia on the colour of meat products. This deterioration directly affects the organoleptic properties.

The known methods of preservation therefore have the common disadvantage that none of them can simultaneously give total microbiological protection, maintain the initial properties and characteristics of the processed products, be used for a very wide range of pasteurised products, and finally be operated under competitive economic conditions.

Accordingly one aim of the invention is to provide a method of preparing a pasteurised product, inter alia a food, so that it has a long shelf life without affecting its nutritional, rheological and organoleptic properties.

Another aim of the invention is to provide a said method which can be adapted to the characteristics of each individual product for processing.

Another aim of the invention is to provide a said method which can be operated with simple, inexpensive equipment.

An additional aim of the invention is to provide a said method of preparing pasteurised products.

Accordingly the aim of the invention is to propose a method of monitoring and processing pasteurised products, more particularly food, so that they have a long shelf life without affecting their nutritional, rheological and organoleptic properties, the method being adapted to the characteristics of each processed product taken individually.

In other words, the aim of the invention is to propose a method for treating food products so that they have a long shelf life, the method being very flexible in adaptation to thermal requirements so that at least a particular value (the pasteurisation threshold value P) has been reached, expressed in points. For example it the pH is 7, in order to destroy streptococci D it is necessary to reach a pasteurization threshold value P of 40 points.

As the skilled man knows, the cooking curve of the product, or the curve of variation of cooking temperature in the interior of the product in dependence on time and the pH thereof, can be used to calculate the resulting pasteurisation threshold value, which is the sum of the points obtained after successive minutes of cooking, allowing for the cooking temperatures in the interior during those minutes.

In order thus to neutralise micro-organisms in sporulated form, a basic principle of the invention comprises creating physical and chemical conditions such that the micro-organisms cannot germinate and grow, with reference to the most dangerous micro-organism, that is *Clostridium botulinum*.

With regard to the growing micro-organisms, it is generally accepted that they are destroyed to a satisfactory extent when the number of streptococci D, which are most resistant to heat, at the end of heat treatment is reduced to a value of $10^0$ per unit volume, starting from a theoretical burden of $10^{20}$. In order to destroy streptococci D, it is known to subject a food product for preparation to heat-treatment for a duration and at a temperature, in dependence on the pH and the rH2 of the treated product, such that at the end of heat treatment a particular value called the pasteurisation threshold value P, expressed in points, has at least been obtained. For example if the pH is 6.3 and the rH2 is 16.5, in order to destroy streptococci D it is necessary to reach a pasteurisation threshold value P of 40 points. A method of this kind is described inter alia in the American document U.S. Pat. No. 5,094,864.

According to this American document, the pH and the redox potential are measured for each food product in the composition of the required cooked dish.

Next, the oxidation potential value is converted to rH2, the criteria being calculated in accordance with Nernst's formula hereinafter. This indicates the activity of these ions on the components of the medium; it influences the chemical and biochemical reactions and consequently influences the micro-organisms.

In other words, the rH2 defines the electronic potential for a given pH. It is therefore calculated from the ionic potential pH and the redox potential E by using the Nernst formula:

$$rH2 = 2\ pH + 33.33\ E$$

The cooking curve of the product or the curve of variation of cooking temperature in the interior of the product in dependence on time and the pH and rH2 thereof, can be used to calculate the resulting pasteurisation threshold value, which is the sum of the points obtained at the end of successive minutes of cooking, allowing for the heating temperatures in the interior during the said minutes.

Conversely, from a knowledge of the pasteurisation threshold value P to be obtained for a product having a given pH and rH2, it is possible to determine the cooking curve and more particularly to choose the maximum temperature, or the maximum and minimum temperatures, and the time for maintaining this temperature plateau or the variation between these temperatures, to ensure that the pasteurisation threshold value P will in fact be reached at the end of cooking. It is also necessary to simultaneously neutralise the micro-organisms in the sporulated state, more particularly the *Clostridium botulinum* potentially present in the treated food product.

It is also known that if the activity Aw of water is reduced, for example by adding sodium chloride to the food product, the micro-organisms and particularly the Clostridia are not totally inhibited. A substantial reduction in the redox potential may result in growth of bacteria in this particular case.

In this connection it is known that if the product is bottled or sterilised, that is if rapidly brought to a high temperature, certain micro-organisms will defend themselves by sporulating, and will then resume growth as soon as the medium and the temperature conditions have again become favourable. It is also accepted that a food product is in a commercially sterile state when at the end of heat-treatment the number of germs of *Clostridium botulinum* has been reduced from $10^{12}$ to $10^0$ per unit volume. This is achieved, in the case of a product at pH 6.5 and rH2 18, if the temperature in the interior is kept at 121.1° C. for 2.52 minutes, whereas if the pH of the product is only 4.5 and the rH2 is 18, the same result is obtained by maintaining a temperature of 85° C. for only 2 minutes. It is also known that micro-organisms which have sporulated cannot germinate except in the presence of free water in the medium. The ratio of free water to total water (the sum of the free water and the combined water) in the product is defined and called Aw. It varies between 0 and 1. It is known that at a pH of 6.5 and an rH2 of 18, spores of *Clostridium botulinum* are inhibited when Aw is below 0.91 and that, depending on the pH and the rH2, the inhibition value of the ratio Aw varies in accordance with known curves which bound a germination region which is stable at a temperature below +2° C., a total inhibition region, and an intermediate inhibition region which is stable at a temperature of +7° to +10° C.

Another preferred feature of the invention therefore is to ensure that when the cooking threshold value is reached, the pH, the rH2 and the ratio Aw of the product correspond to a point in the inhibition region which is stabilised at a temperature of +7° to +10° C., which ensures a long shelf life under normal industrial conditions and matches the periods of time most commonly fixed by commercial constraints on the sell-by dates of food products.

During the phase of preparation of the cooking recipe or when the dish has just been cooked, for example before it has received a considerable influx of heat, the pH and the redox potential E of the ingredients are directly measured. Each ingredient in the composition of the product supplies a pH and an rH2 which participates in that of the final dish. For example fruit juices are acid, and likewise wine, particularly white wine, is acid and often oxidising. These two criteria, the pH and the rH2, are associated so as to situate each ingredient and each raw material on a pH-rH2 graph. It is then possible to situate these ingredients with respect to the privileged regions of growth of micro-organisms harmful to the quality and shelf life of the product.

In the agricultural and food industry, the usual aim is to place the food product in a region where the pH is below 5.5. This conventional acidification takes no account of another factor essential to growth of micro-organisms, that is the redox potential. This is an essential factor in the growth of bacteria, since it determines the growth of vegetative forms and the germination of spores.

For example, strictly aerobic bacteria, that is those which can grow only in the presence of oxygen, require a high redox potential. Conversely anaerobic bacteria, which cannot grow in the presence of oxygen, require a negative redox potential. *Clostridium botulinum,* a very dangerous bacterium, will grow more easily, even in an acid medium, if the redox potential is low and the water activity is near unity.

In view of the preceding, one feature of the method in accordance with the invention is firstly to determine the pasteurisation threshold value of the product from the measured pH and the redox potential thereof; secondly to check that the pasteurisation threshold value has at least been reached and is preferably exceeded. If this is not the case, it is necessary to modify the pH and/or the rH2 of the product and if necessary to modify the maximum temperature of the cooking curve, so that at the end of cooking, the temperature has been reached in the interior after exceeding the pasteurising threshold value.

This will ensure that, on the one hand, the product has been cooked to a turn so as to have the optimum taste, and that on the other hand the streptococci D are destroyed, that is all vegetative forms. However it is necessary simultaneously to neutralise the micro-organisms in the sporulated state, particularly *Clostridium botulinum,* which is potentially present in the processed food product.

The previously stated aim and others which will appear hereinafter are obtained by a method of preparing a pasteurised product, inter alia food, so as to ensure a long shelf life of the product without affecting its nutritional, rheological and organoleptic properties, and comprising:

determining the pasteurisation threshold value of the product and subjecting the product to heat treatment or cooking so as to reach the said value, the method according to the invention being characterised in that it also comprises:

measuring the pH and the rH2 of the product and deducing the corresponding pasteurisation threshold value therefrom, measuring the ratio Aw of free water to total water in the product and determining the heat-treatment heating curve by varying the pH and/or rH2 values and/or the ratio Aw of the product, without reducing the pH below 4.5 and ensuring that the variation of temperature with time is such as to exceed the minimum lethal temperature below which streptococci D are not destroyed, so that the pasteurisation threshold value is reached and preferably exceeded, and so that the product is under physical and chemical conditions which correspond to the *Clostridium botulinum* germ inhibition region.

Advantageously the process also consists in heat-treatment in a water bath or oven or autoclave with a relatively gentle slope of temperature rise between a minimum temperature and a maximum temperature chosen to allow for the rheological characteristics of the product for pasteurising, for example the food, the maximum temperature always remaining below 100° C. so as not to spoil the appearance of the product. This is because it is not advantageous for the temperature in the interior of the product to increase rapidly, since when the temperature rises slowly the sporulated micro-organisms can germinate and can then be destroyed or inhibited. If on the other hand the temperature increases quickly, the micro-organisms may remain in the sporulated state. Heating on a water bath or in an oven or autoclave has the advantage that a curve with a relatively gentle heat gradient can be reproduced with great reliability, and can be obtained with inexpensive equipment. It is also easy to regulate.

According to a preferred feature of the invention, the pasteurisation threshold value P is deduced from the pH and the rH2 measured by using a semilogarithmic graph portion representing a continuous function of the pasteurisation threshold value in dependence on the pH and the rH2.

This method is used for measurement of the pH and E (the redox potential) in each category of constituents of the cooked dish, pH (1) and E (1) of the main constituent, pH (2) and E (2) of the vegetables, and pH (3) and E (3) of the sauce, using the following formulae:

$$pH = \frac{2pH(1) + pH(2) + pH(3)}{4}$$

$$E = \frac{2E(1) + E(2) + E(3)}{4}$$

In a preferred embodiment, for simultaneous adjustment of the cooking temperatures, particularly the maximum temperature, which affects the appearance of the product at the end of cooking, the method in accordance with the invention is such that it comprises, at the beginning of heat treatment, in also measuring the initial temperature of the product; determining the heat-treatment temperature range using a family of curves which, for different pH and rH2 values, give the pasteurisation threshold values in dependence on the temperature and time; calculating, on the basis of this family of curves, the sum of the pasteurisation points at the measured pH and rH2, and adopting the thus-defined heat treatment and the physical and chemical conditions of the product if the said sum is above the pasteurisation threshold value whereas if the said sum is below the pasteurisation threshold value the pH and/or rH2 of the product and the maximum temperature of heat treatment are modified, and if the sum is substantially equal to the pasteurisation threshold value the maximum temperature is modified in order to obtain another heat treatment at which the said sum will be greater than the pasteurisation threshold value as soon as the cooking threshold value has been reached; measuring the ratio Aw after rapid cooling to the interior of the product; reading the curves 1 to 5 giving the pasteurisation values in dependence on the ratio Aw and the pH in order to find whether the product is in a region of stability and inhibition of *Clostridium botulinum,* and if the product is in the germination zone, modifying the pH and/or the rH2 and the ratio Aw so that it comes into the inhibition region.

Advantageously in accordance with the invention, in the case of a food product such as a cooked dish, the pH and the rH2 of the product are measured in the solid phase and in the liquid phase or sauce, and the highest pH is adopted for the treatment. It is also preferable to apply heat-treatment by reproducing a curve showing penetration of the heat to the interior, at the critical point of the product.

The following description, which has no limitative force, should be read with regard to the accompanying drawings in which:

In order to work the method of preparation in accordance with the invention, it is assumed that the optimum cooking threshold value of the product for preparation is known with good accuracy.

The cooking threshold value can be determined as follows: firstly the curve of penetration of heat into the product is measured, using a temperature recording device, for example by placing a thermal probe at the critical point of the product, when packed as specified for distribution.

The ambient temperature is provided by a water bath (or an oven or autoclave). The curve is recorded until cooling.

In order to determine the cooking threshold value Cg, that is the cooking time necessary for the product to be cooked to a turn without overcooking, samples are taken at regular intervals until a sample has the desired taste.

At that instant, cooling is effected. The interval between this instant and the moment when the temperature returns to 20° C. is used retrospectively to determine the instant of cooling on the curve hereinbefore. It is thus possible to determine the cooking threshold value Cg, that is the time interval between the instant when heat treatment begins and the instant of cooling.

This process is repeated a sufficient number of times to determine the cooking threshold value Cg with maximum accuracy, and so that the results are statistically representative.

In order to convert to an industrial scale, it is essential to allow for the initial temperature at the moment of preservative heat treatment and of the initial cooking resulting from implementation of the method, in order accurately to determine the cooking threshold value Cg during the preservative treatment.

The use of a water-bath or an oven is justified, since it is thus possible to obtain a relatively slow temperature increase, from a minimum treatment temperature of 65° C. in the interior at the critical point, to a maximum temperature of 85° C. except in special cases.

When the cooking threshold value of the product is known, it is necessary, in order to work the method or preservative treatment in accordance with the invention, first to determine certain parameters of the product, inter alia to measure the initial temperature To, the pH of the product and the ratio Aw of free water to total water in the product, and to allow for the packing, the smallest dimension of which is preferably below 50 mm. When the pH of the product is known, the corresponding pasteurisation threshold value can be determined from the curve in FIGS. 1 to 5, which shows the variation of the pasteurisation value P in dependence on pH for a given ratio Aw.

Next, using the curves of pasteurisation values in FIG. 6, that value of heat treatment which ensures the desired destruction of micro-organisms is determined, bearing in mind that if the pH is below 4.5 and heat treatment lasts for 2 minutes at 85° C. in the interior of the product, it will no longer be a stabilised fresh product but a preserve.

Figure 1:
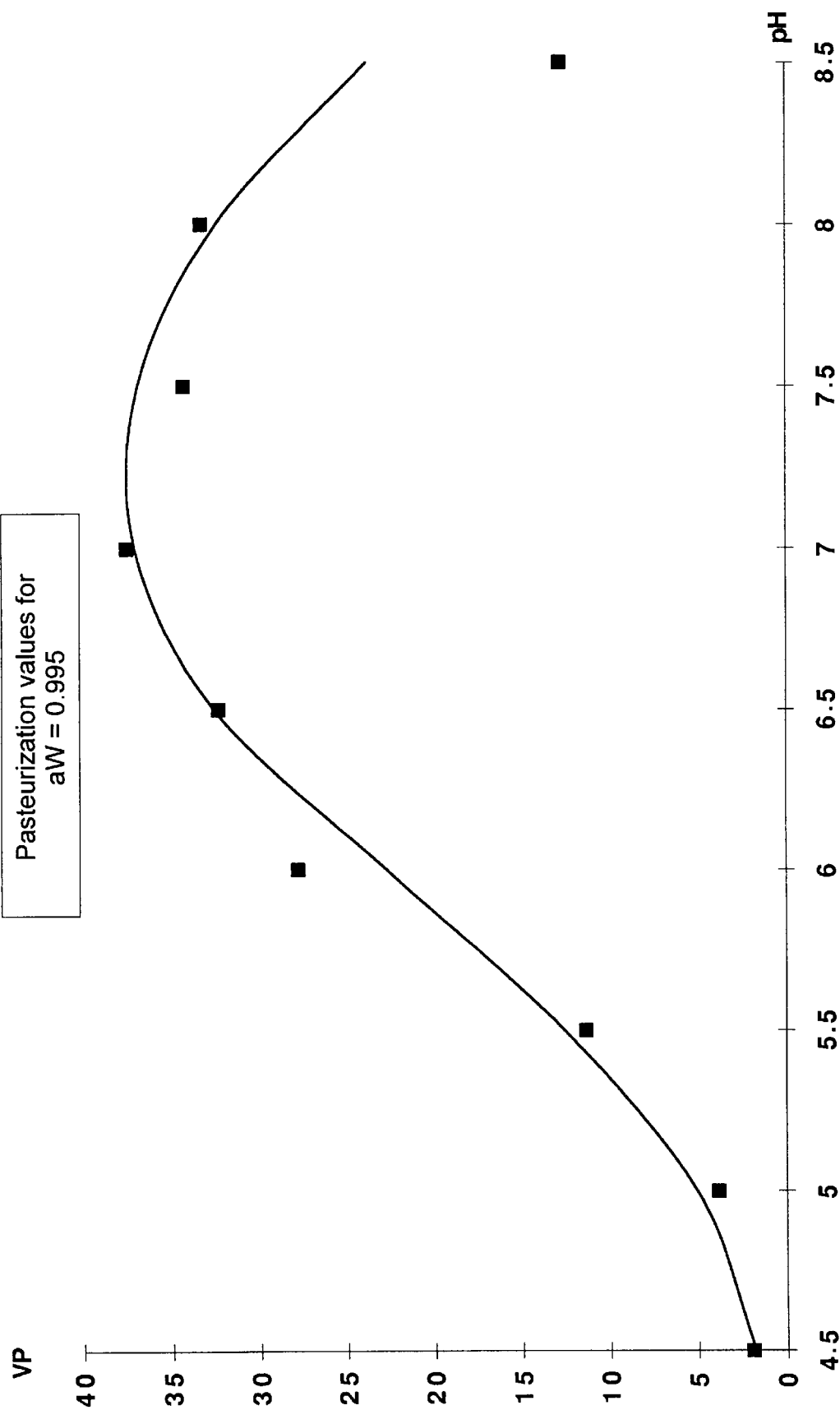
FIGS. 1–5 represent a continuous function of the pasteurisation threshold value VP in dependence on the pH and the Aw. The curves show the limits of stability and germination, depending on the heat treatment, for *Clostridium botulinum* when the ratio Aw varies from 0.955 to 1, and the pH is between 7.5 and 4.5.
Figure 2:
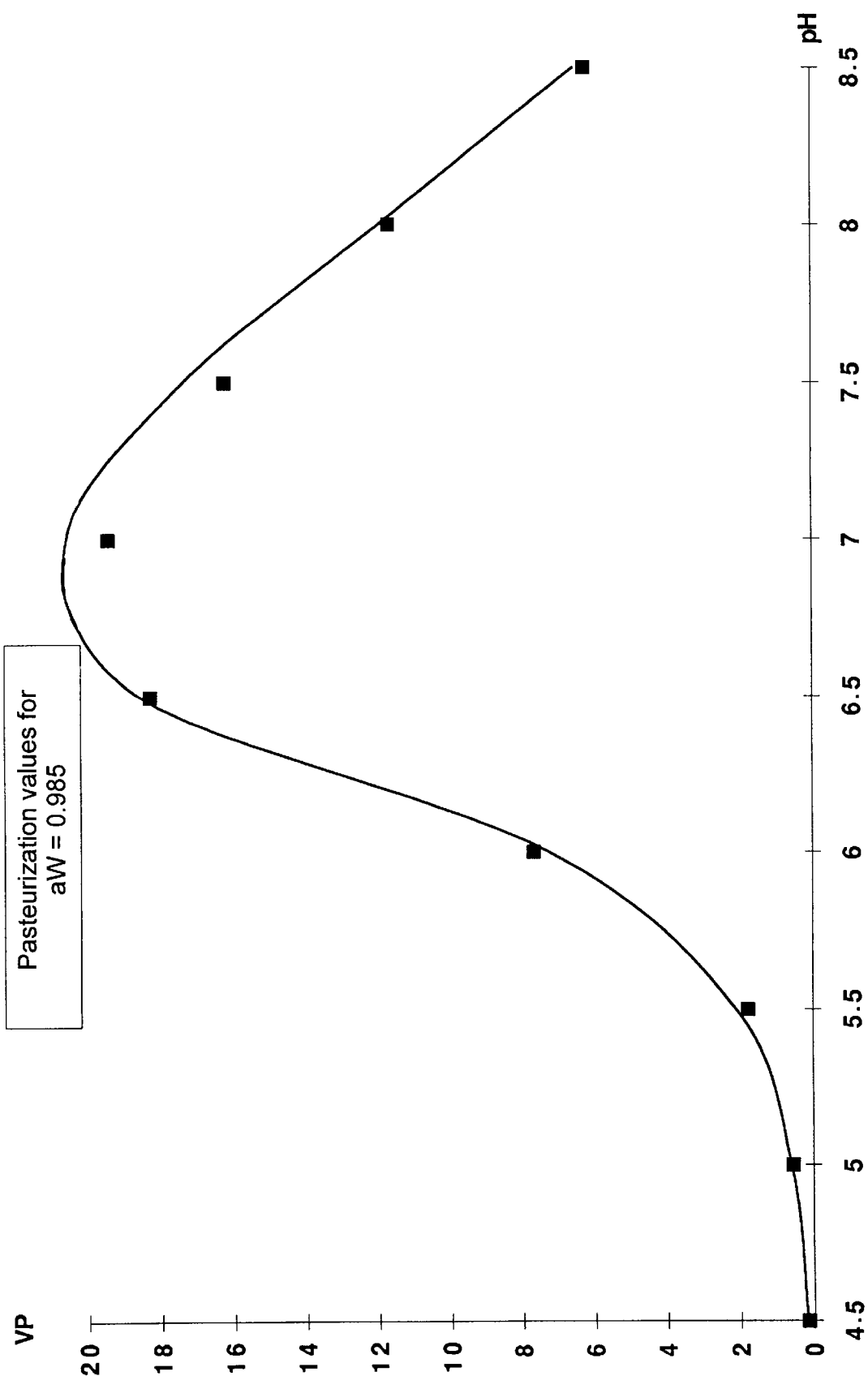
Figure 3:
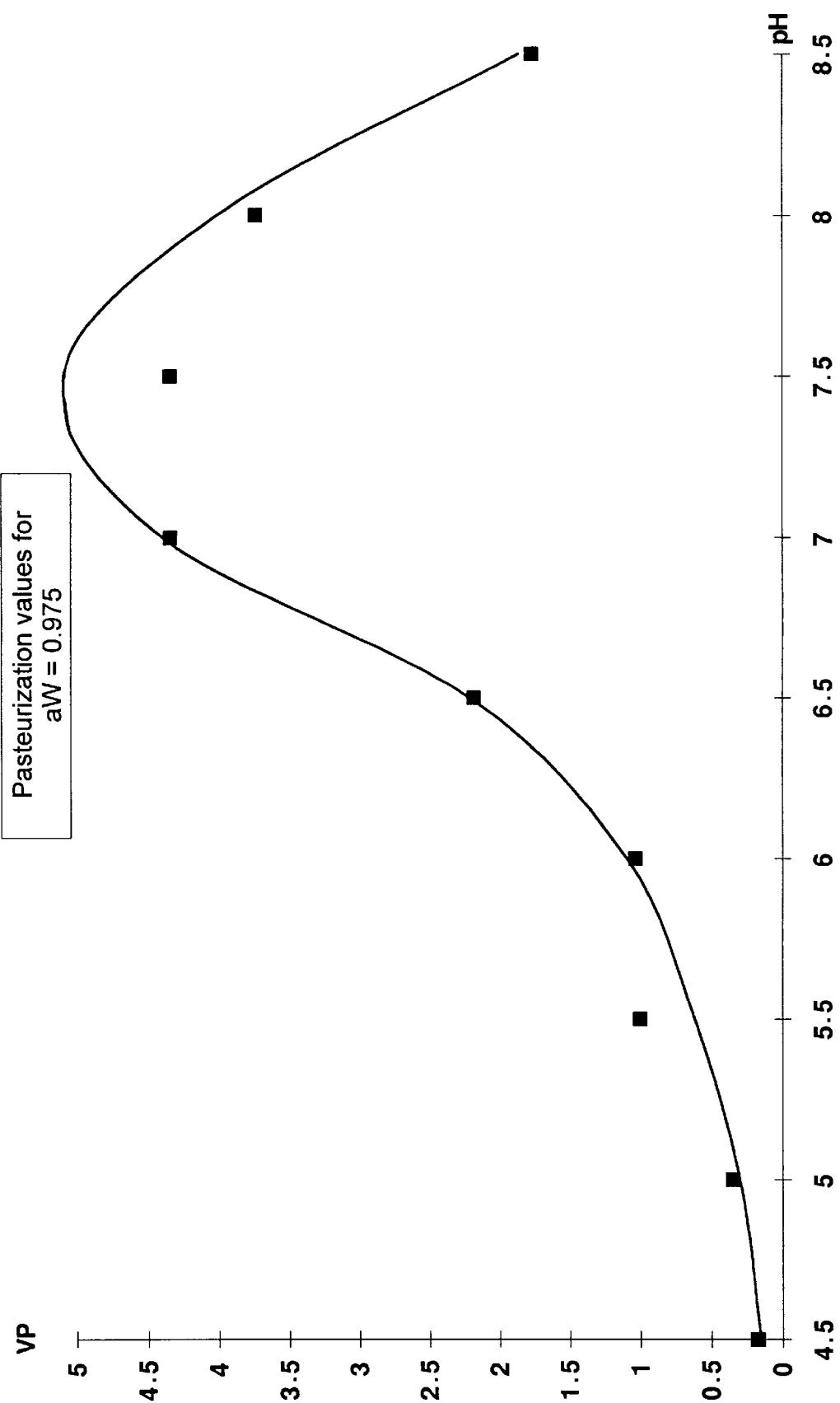
Figure 4:
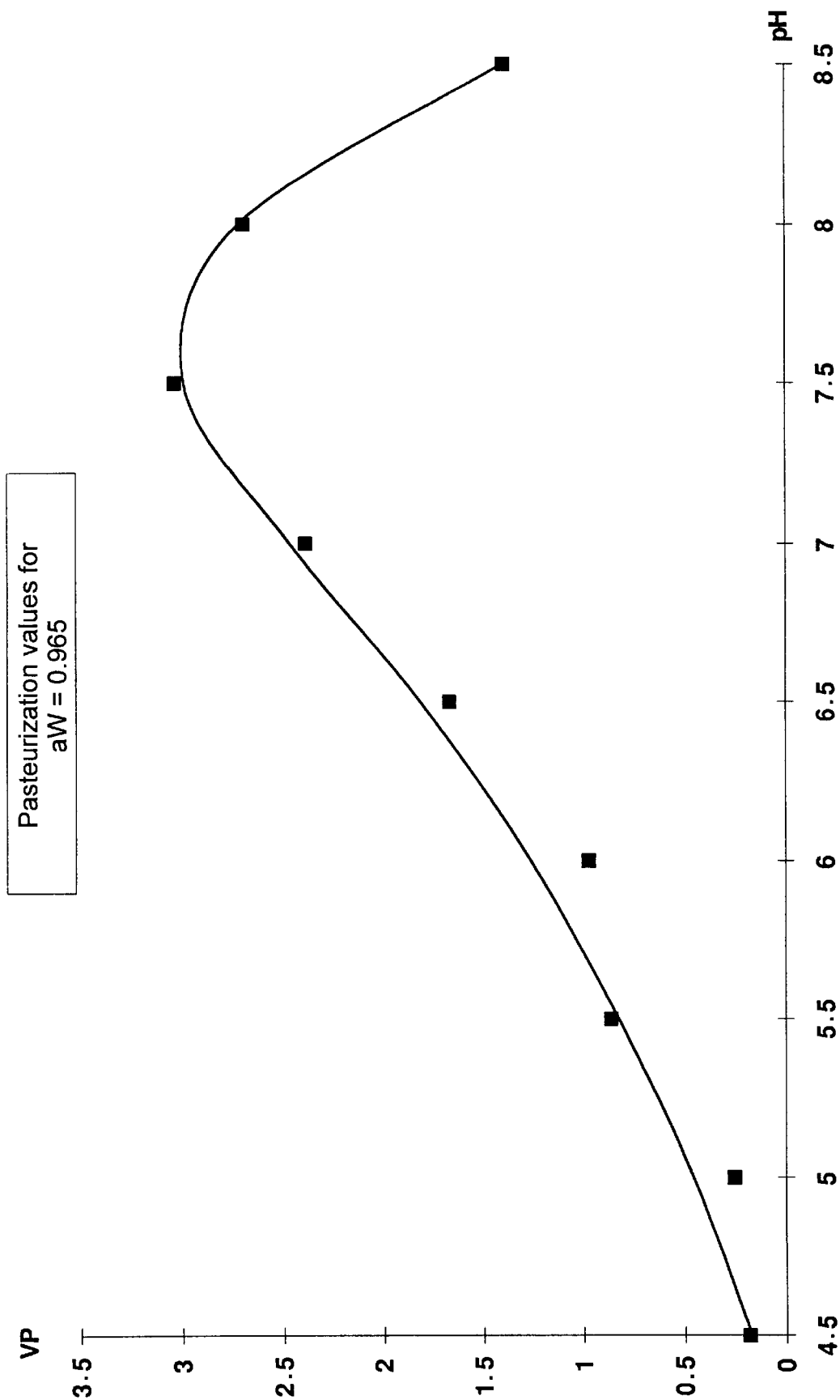
Figure 5:
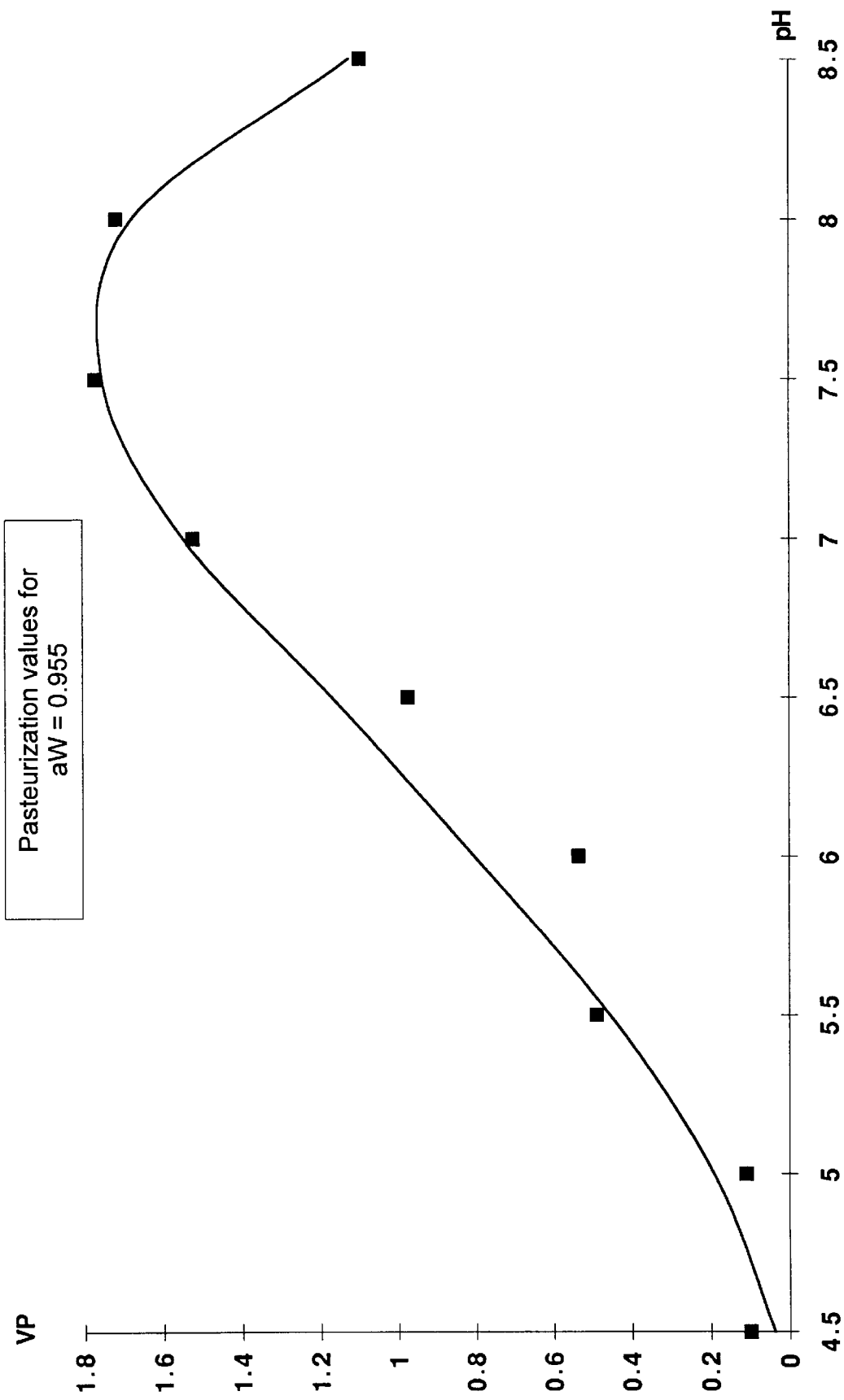
Figure 6:
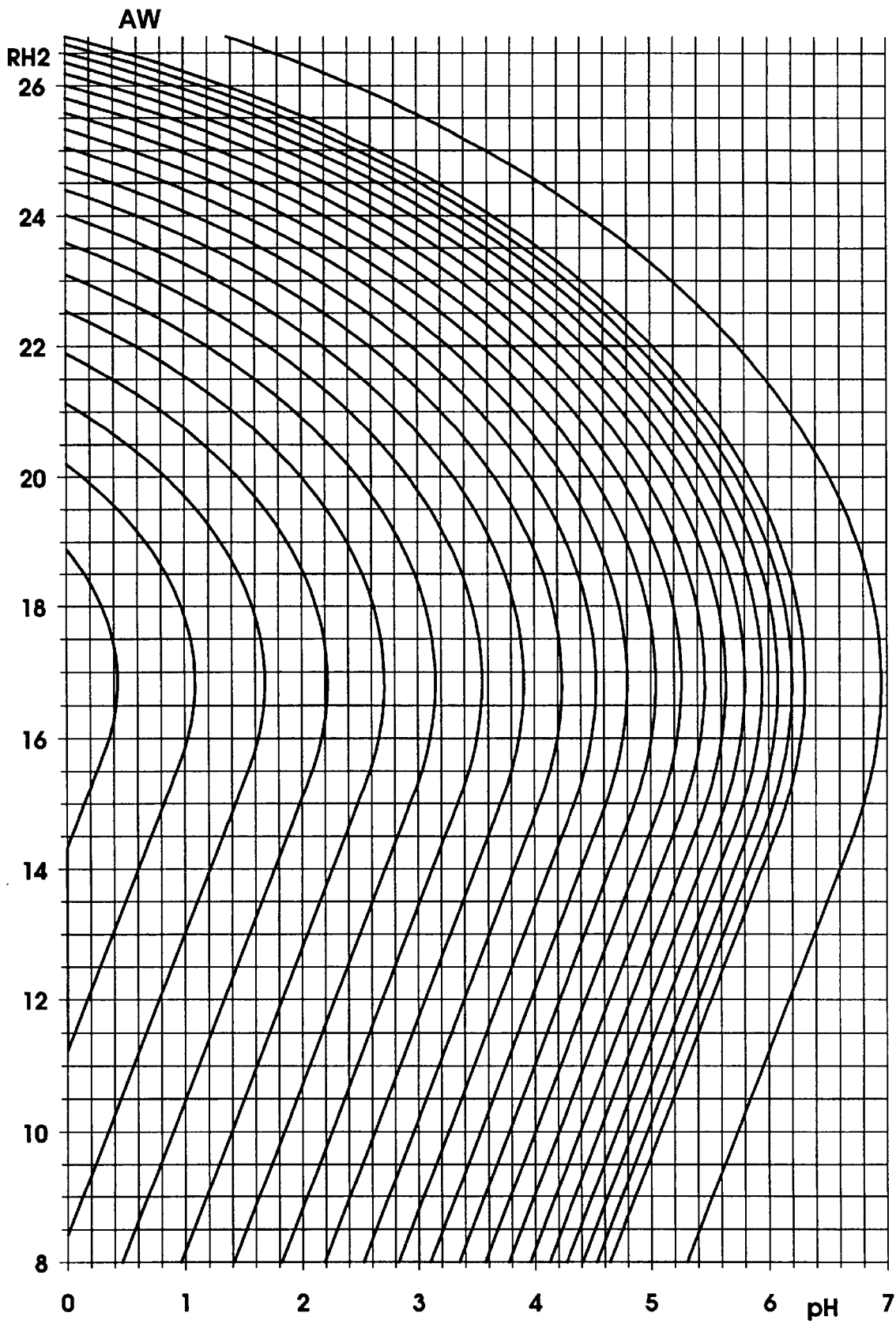
FIG. 6 is a family of curves in semi-logarithmic co-ordinates of the pasteurisation threshold values associated with the cooking temperature in dependence on time, for various values of pH and rH2, the curves decreasing continuously and having a concavity facing the left, between a maximum internal temperature and a minimum temperature corresponding to the lethal threshold for destruction of streptococci D (that is the temperature threshold below which streptococci D cannot be destroyed).

The curves in FIG. 6 can thus be used to: determine the maximum heat-treatment value (the maximum temperature in the interior) and the range of heat-treatment temperatures, for example from 65° to 85° C. The maximum temperature in the interior is for example programmed in a device for programming and recording curves for pasteurisation threshold values P, cooking threshold values Cg and values for the pasteurisation point per minute, per temperature and per pH in dependence on the rH2. Next, using the curves in FIG. 6 as before, the values of the pasteurisation points per minute and of the measured pH and rH2 are determined, and the sum of these point values is calculated. The calculation can be automatically made by the programming and recording device.

Note that the curves in FIG. 6 also give information about the duration of heat treatment in dependence on the temperature plateaux, which is a means, after determining the cooking threshold value C, of determining in advance whether the treatment resulting from this determination is sufficient to obtain the desired stabilisation.

For example if the initially-mentioned pH is 5.8 and the rH2 is 18.5, it corresponds to a pasteurisation threshold value of 20. At a maximum temperature of 70°, the duration of treatment under these conditions will be between 24 and 30 minutes. If the desired cooking threshold value C is lower, it will be necessary to reduce the pH in order to preserve the organoleptic qualities of the product while destroying the vegetative forms and stabilising the product. At a pH of 5.5 and an rH2 of 17.9 and at a maximum temperature of 70° C., the corresponding pasteurisation threshold value Vp is 10.

The duration of heat treatment necessary for achieving this value will be 14 to 20 minutes depending on the starting temperature in the interior, so that one can be certain that at the end of heat treatment, when the cooking threshold value has been reached, the pasteurisation threshold value will certainly have been exceeded.

Returning to the previous example, if the cooking threshold value Cg is above 20, the heat treatment will be sufficient and it will then be unnecessary to make further calculations. On the other hand if the cooking value is near 20, the pH and the maximum temperature will be accurately determined in order to have a safety margin without needing to modify the duration of heat treatment.

At the practical level, therefore, the method comprises the following in succession:

1) determining the cooking threshold value Cg,
2) reproducing the curve of penetration of heat to the interior, at the critical point of the product,
3) measuring the initial temperature at the beginning of treatment, the pH and the initial rH2 in the liquid phase and in the solid phase for treatment,
4) determining the pasteurisation threshold value P, using the family of curves which express it in dependence on the pH and the rH2,
5) determining the range of corresponding temperatures,
6) applying heat treatment in a water bath or in an autoclave, measuring the temperatures per minute, so that the cooking threshold value Cg is respected,
7) calculating the sum of the values of the pasteurisation points for the measured pH and the rH2, which can be done automatically by a programming and recording device,
8) maintaining the initially-provided heat treatment and preserving the resulting product if the sum of the values of the pasteurisation point is greater than the pasteurisation threshold value,
9) alternatively modifying the pH and/or the rH2 and the maximum temperature if the sum of the values of the pasteurisation points is below the pasteurisation threshold value,
10) modifying only the maximum temperature if the said sum of the values of the pasteurisation points is substantially equal to the pasteurisation threshold value,
11) rapidly cooling the product to a minimum of 10° C. in the interior, in less than 2 hours,
12) measuring the ratio Aw of free water to total water in the product, after heat treatment,
13) checking the list of natural inhibitors such as alcohols, organic acids, nitrites, aromatics, etc,
14) reading the curves in FIGS. 1 to 5 to see whether the product obtained is in a region of stability and inhibition of *Clostridium botulinum*,
15) checking the initial and final microbial burdens in reference germs (tested germs),
16) allowing for the natural inhibitors and the final microbial burden before accepting the product within the upper limit of the inhibition region,
17) modifying the pH, the pasteurising value P and the maximum temperature if the final microbial burden does not conform to the regulations in force,
18) modifying the pH, the ratio Aw and the salts in the product if it is within the germination region, and
19) finally storing the product in positive cold (at 3° C.).

The method in accordance with the invention as defined hereinbefore is particularly suitable for industrial preparation of food products such as cooked or other dishes, distributed in positive cold and sold by chain stores, for preparation in advance and in a number of cooked dishes intended for collective catering or for chains of restaurants, for which the method has the advantage of permitting production in a centralised kitchen and heating of the dishes in microwave ovens so as quickly to meet customers' requirements and prepare cooked dishes for automatic dispensers in commercial refrigerators, etc.

I claim:

1. A method of preparing a product for pasteurising so as to ensure that the product has a long shelf life without affecting its nutritional, rheological or organoleptic properties, comprising:

determining a cooking threshold value (Cg) of the product, subjecting the product to heating or cooking treatment so as to achieve the said value (Cg) without exceeding it, measuring the pH and the rH2 of the product and deducing the corresponding pasteurisation threshold value (P) thereof, and measuring the ratio Aw of free water to total water in the product and determining a heat-treatment heating curve by varying the pH or rH2 value or the Aw ratio of the product without reducing the pH below 4.5 and taking care that the variation with time of the cooking temperature is sufficient to exceed the lethal minimum temperature below which streptococci D are not destroyed, in order simultaneously to ensure that when the cooking threshold value (Cg) is reached, the pasteurisation threshold value (P) is at least reached, and that the product is under physical and chemical conditions corresponding to a *Clostridium botulinum* germ inhibition region, wherein the method further comprises, at the beginning of the heat treatment, measuring the initial temperature of the product; determining the range of heat-treatment temperatures by means of a set of curves which, for different values of the pH and rH2, given the pasteurisation threshold values in dependence on the temperature and duration of cooking; calculating, on the basis of the set of curves, the sum of the pasteurisation points for the measured pH and rH2 and, when the cooking threshold value is reached, maintaining the heat treatment and the physical and chemical properties of the thus-defined product if the said sum is above the pasteurisation threshold value, whereas if the said sum is below the pasteurisation value the pH or the rH2 of the product and the maximum heat-treatment temperature are modified, and if the said sum is substantially equal to the pasteurisation threshold value, only the maximum temperature of heat-treatment is modified in order to obtain a new heat treatment at which the said sum will be greater than the pasteurisation threshold value as soon as the cooking threshold value has been reached; measuring the ratio Aw after rapid cooling of the product up to its interior; calculating the curves expressing Aw in dependence on the pH and rH2 to determine whether the product is within a Clostridium stability and inhibition zone, and if the product is within a germination region, modifying the pH and the ratio Aw so that it comes within the said inhibition region.

2. The method of preparation according to claim 1, wherein it comprises heat-treatment in a water bath or oven or autoclave with a reproducible slope of temperature rise between a minimum temperature and a maximum temperature chosen to allow for rheological characteristics of the product for pasteurising, the maximum temperature always remaining below 100° C. so as not to spoil the appearance of the product.

3. The method of preparation according to claim 1, wherein the pasteurisation threshold value (P) is deduced from the measured pH and the rH2, using a portion of a set of curves which express (P) in dependence on the pH and the rH2.

4. The method of preparation according to claim 1, wherein it comprises applying the heat-treatment by reproducing a curve representing penetration of heat to the interior.

5. The method of preparation according to claim 1, wherein the product is a food.

* * * * *